(12) United States Patent
Salapow et al.

(10) Patent No.: US 6,649,912 B2
(45) Date of Patent: *Nov. 18, 2003

(54) THERMAL IMAGING CAMERA

(75) Inventors: Thomas M. Salapow, Ellwood City, PA (US); David C. Demyan, Gibsonia, PA (US); James A. Hendrickson, Freedom, PA (US); Michael F. Becker, Bethel Park, PA (US); Anthony J. Brewer, Pittsburgh, PA (US); Eric R. Colburn, Wexford, PA (US); Roland Zeder, Pittsburgh, PA (US)

(73) Assignee: Mine Safety Appliances Company, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/231,328

(22) Filed: Aug. 29, 2002

(65) Prior Publication Data

US 2002/0195562 A1 Dec. 26, 2002

Related U.S. Application Data

(63) Continuation of application No. 09/779,926, filed on Feb. 8, 2001, now Pat. No. 6,486,473.
(60) Provisional application No. 60/186,509, filed on Mar. 2, 2000, and provisional application No. 60/222,775, filed on Aug. 3, 2000.

(51) Int. Cl.⁷ .................................................. G01J 5/04
(52) U.S. Cl. ...................................... 250/330; 250/332
(58) Field of Search ................................. 250/330, 332, 250/338.2, 339.15; 362/196, 294

(56) References Cited

U.S. PATENT DOCUMENTS

| | | | | |
|---|---|---|---|---|
| 3,752,983 A | * | 8/1973 | Yanez | 250/333 |
| 4,586,117 A | * | 4/1986 | Collins | 362/373 |
| 5,422,484 A | * | 6/1995 | Brogi et al. | 250/339.15 |
| 5,570,948 A | * | 11/1996 | Menke et al. | 362/191 |
| 5,710,428 A | * | 1/1998 | Ko | 250/332 |
| 5,907,721 A | * | 5/1999 | Schelling et al. | 396/27 |
| 6,411,332 B1 | * | 6/2002 | Whitby et al. | 348/376 |
| 6,486,473 B2 | * | 11/2002 | Salapow et al. | 250/330 |
| 2002/0162963 A1 | * | 11/2002 | Lannestedt et al. | 250/351 |

* cited by examiner

Primary Examiner—Constantine Hannaher
Assistant Examiner—Christine Sung
(74) Attorney, Agent, or Firm—James G. Uber; Henry E. Bartony, Jr.

(57) ABSTRACT

A thermal imaging camera having improved durability and ergonomic features including generally a seamless housing encompassing a thermal imaging core, a first handle, and a battery compartment. The housing is preferably positioned at a first end of the first handle and the battery compartment is positioned at the opposite end of the first handle. By positioning the first handle intermediate between the housing and the battery compartment, the center of gravity of the thermal imaging camera coincides generally with the handle when the thermal imaging camera is in use, that is when batteries are present within the battery compartment. The camera can also include a second handle positioned between the housing and the battery compartment, the second handle is preferably oriented generally parallel to and spaced apart from the first handle to facilitate passing of the thermal imaging camera between users. The camera also has improved water resistance, shock-resistance and other operational features.

9 Claims, 8 Drawing Sheets

THERMAL IMAGING CAMERA

RELATED APPLICATIONS

The present application is a continuation application of U.S. patent application Ser. No. 09/779,926, filed Feb. 8, 2001, (now U.S. Pat. No. 6,486,473) which claimed priority on U.S. Provisional Application Nos. 60/186,509 and 60/222,775, filed Mar. 2, 2000 and Aug. 3, 2000, respectively.

FIELD OF THE INVENTION

The present invention relates to thermal imaging cameras and, especially, to thermal imaging cameras having improved durability and ergonomic features.

BACKGROUND OF THE INVENTION

Thermal imaging cameras ("TICs") are a relatively new tool used, for example, by firefighters and other safety personnel to provide the ability to see heat sources in situations of limited visibility (for example in heavy smoke or darkness). Thermal imaging cameras find use in many scenarios including, but not limited to, executing search and rescue missions, assessing fire scenes, locating the seat of fires, determining the size and location of hot spots, identifying potential flashover situations, determining entry and ventilation points, evaluating hazardous material situations, providing an incident command "eye in the sky", providing vehicle navigation, preplanning fire code inspections and assisting law enforcement officers.

Many thermal imaging cameras use ferroelectric thermal imaging. Ferroelectric cameras are solid-state infrared imagers that measure changes in heat by sensing changes in capacitance. The focal plane includes a plurality of small ceramic pixels that are made of sensing materials such as barium strontium titanate. An example of such a camera is the Argus 2 TIC sold by MSA and shown in MSA Bulletin No. 0119-23 (1999).

Pyroelectric vidicon tube cameras also detect changes in capacitance. Because the capacitance of a fixed scene on the focal plane does not change, the visible scene temperature must be artificially manipulated to generate an image in the case of pyroelectric and ferroelectric cameras. In such cameras, the blades of a chopper pass in front of the detector and effectively change the scene temperature with each pass. Each pass of a chopper blade causes a change in capacitance and allows the detector to see an infrared image. Examples of pyroelectric vidicon tube cameras are the Argus TIC and the Argus Plus TIC, previously sold by MSA and shown in MSA Bulletin Nos. 0105-16 (1997) and 0105-16 (1998), respectively.

Recently, microbolometers have been used in thermal imaging cameras. A microbolometer thermal detector is a sensor that measures changes in heat and infrared energy. It measures heat by sensing the changes in resistance of each pixel in the focal plane. The microbolometer detector is constructed of an array of pixels that are made of sensing materials such as vanadium oxide. Pixel resistance changes are directly related to temperature and allow the camera to produce an infrared image without the use of a chopper as is required with pyroelectric and ferroelectric cameras.

Because of the harsh conditions in which thermal imaging cameras are used, such cameras are preferably very durable. In the case of thermal imaging cameras used by firefighters, for example, the cameras can be exposed to extremely high temperatures as well as very wet conditions. Moreover, these cameras must also be adapted to dissipate any excess heat generated inside the camera due to its internal electronics. Although thermal imaging cameras should be durable, they should also be suitable for use by individuals having somewhat limited mobility and dexterity. In that regard, firefighters are equipped with protective clothing, including thick gloves, that limit their ability to accomplish certain tasks. Currently available thermal imaging cameras satisfy the above criteria to differing degrees. It, therefore, remains very desirable to develop thermal imaging cameras having improved ergonomics and durability.

SUMMARY OF THE INVENTION

The present invention provides a thermal imaging camera including generally a housing encompassing a thermal imaging core, a first handle, and a battery compartment. The housing is preferably positioned at a first end of the first handle and the battery compartment is positioned at the opposite end of the first handle. By positioning the first handle intermediate between the housing and the battery compartment, the center of gravity of the thermal imaging camera coincides generally with the handle when the thermal imaging camera is in use (that is, when batteries are present within the battery compartment). The camera can also include a second handle positioned between the housing and the battery compartment, the second handle is preferably oriented generally parallel to and spaced part from the first handle and facilitates the passing of the thermal imaging camera between two users.

In another aspect, the present invention provides a thermal imaging camera including resilient material placed over or around all projecting portions of the thermal imaging camera such that when the thermal imaging camera is contacted with a plane, the resilient material will first contact the plane regardless of the orientation of the thermal imaging camera relative to the plane. In other words, if the thermal imaging camera is dropped on a generally flat surface, the resilient material contacts the surface first, thereby reducing the likelihood of damage to the camera due to the shock-absorbing properties of the resilient material.

In one embodiment, the thermal imaging camera includes a housing encompassing a thermal imaging core, a handle, and a battery compartment. The housing is positioned at a first end of the handle and the battery compartment is positioned at the opposite end of the handle. The housing has resilient material surrounding a front end thereof and a rear end thereof. Likewise, a bottom portion of the battery compartment is also surrounded by resilient material. The resilient material can be in the form of elastomeric (for example, rubber) bumpers having shock-absorbing properties.

In another aspect, the present invention provides a thermal imaging camera including a housing encompassing a thermal imaging core, a first handle and a second handle. The first handle and the second handle are positioned to facilitate passing the camera between two people without setting the camera down. Any number of two-handle configurations will work including, for example, a "steering wheel" configuration with the camera located in the center and a plurality of spokes extending from the camera to the outer handles or ring. As described above in one preferred embodiment, the first handle and the second handle can be positioned generally parallel to and spaced apart from each other and can be positioned intermediate between the housing and the battery compartment. When the first handle and the second handle are positioned generally parallel to each other, the handles are preferably spaced at least 2.0 inches apart, more preferably at least approximately 2.25 inches apart, and most preferably at least approximately 2.5 inches apart, over the area in which the handles are to be grasped.

The present invention also provides in another aspect a thermal imaging camera including a water-resistant housing to contain the camera components. The housing has only a front opening and a rear opening and is formed without a seam therein such that the seamless housing of the present invention has only about ¼ of the sealing surface found in other TICs. The front opening preferably has a generally flat sealing surface; likewise, the rear opening preferably has a generally flat sealing surface both of which significantly reduce the likelihood or water intrusion into the housing.

In another aspect, the present invention provides a thermal imaging camera including a durable housing to contain at least one imaging component and at least one support member to position the imaging component within the housing without attaching or connecting the imaging component to the housing. The support member preferably has an exterior formed generally in the shape of the housing and an interior formed generally in the shape of the imaging component. The support member is preferably shock absorbing and/or thermally insulating. An example of a suitable material for the support member is a foamed polymer. Preferably, a plurality of components comprising the camera engine or camera core are positioned in the housing using such support members.

The present invention also provides a thermal imaging camera including a housing to contain at least one imaging component. The imaging component is at least partially abutted by a thermally insulating and shock absorbing material positioned between the housing and the imaging component. As discussed above, the thermally insulating and shock absorbing material can be a foamed polymer.

In another aspect, the present invention provides a thermal imaging camera including a power source that has at least a first battery and a second battery. The thermal imaging camera further includes circuitry so that power is first drawn from one of the first battery and the second battery and then from the other of the first battery and the second battery. The first battery and the second battery are preferably replaceable while the thermal imaging camera is operating. For example, the first battery can be drawn down until power is switched to the second battery. The first battery can then be replaced during operation while the camera is being powered by the second battery. Later the second battery can be replaced while the camera is being powered by the other battery and so on. In this manner, the thermal imaging camera can be operated for long periods of time without shutting down the camera to replace batteries.

In still a further aspect, the present invention provides a thermal imaging camera including a generally flat surface thereon whereby the thermal imaging camera can be set in an upright position on a generally flat surface. In one embodiment, the thermal imaging camera includes a housing encompassing a thermal imaging camera core, a battery compartment, and at least a first handle positioned between the housing and the battery compartment. In this embodiment, the bottom of the battery compartment is generally flat so that the thermal imaging camera can be set in an upright position on a generally flat surface such that the camera display is easily visible and the image thereon is also in an upright position.

DETAILED DESCRIPTION OF THE INVENTION

FIGS. 1–6 show various external views of a preferred embodiment of the thermal imaging camera of the present invention. Attached hereto as Appendix 1 is the final version of the Operations and Instruction Manual for the Evolution™ 4000 Thermal Imaging System, the disclosure of which is incorporated herein by reference.

Figure 1:
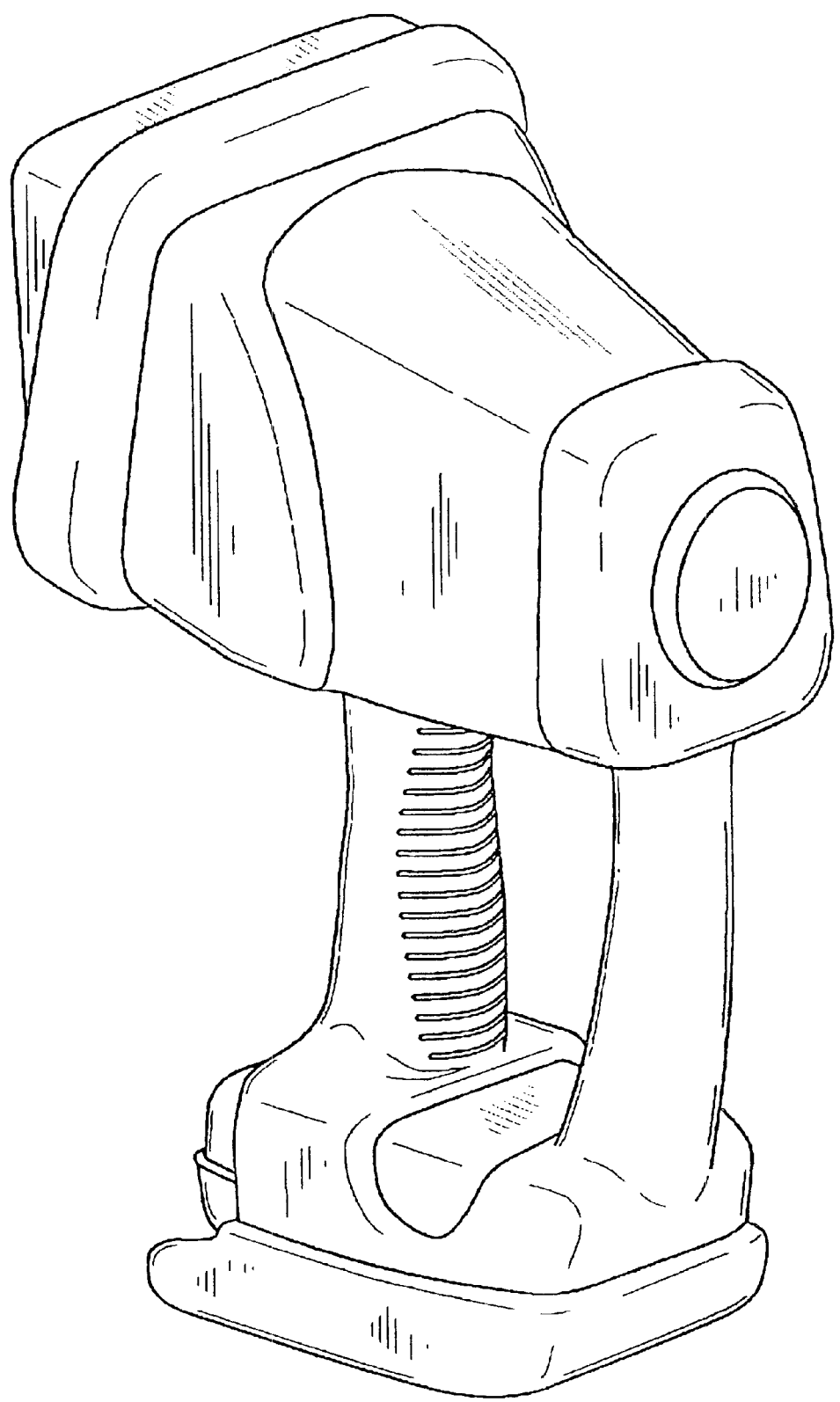
FIG. 1 is a perspective view of an embodiment of a thermal imaging camera of the present invention.
Figure 2:
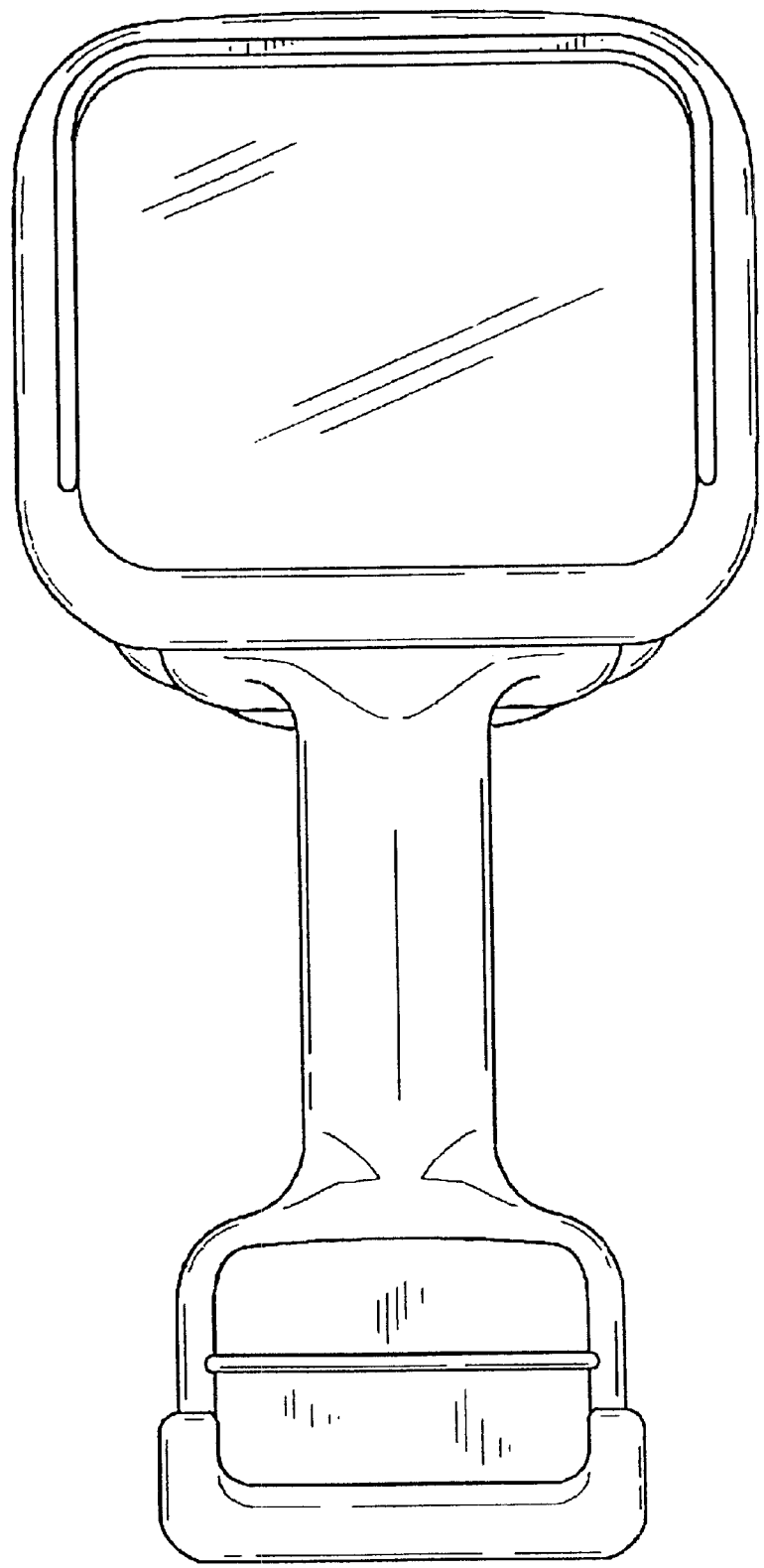
FIG. 2 is a rear elevational view of the camera shown in FIG. 1.
Figure 3:
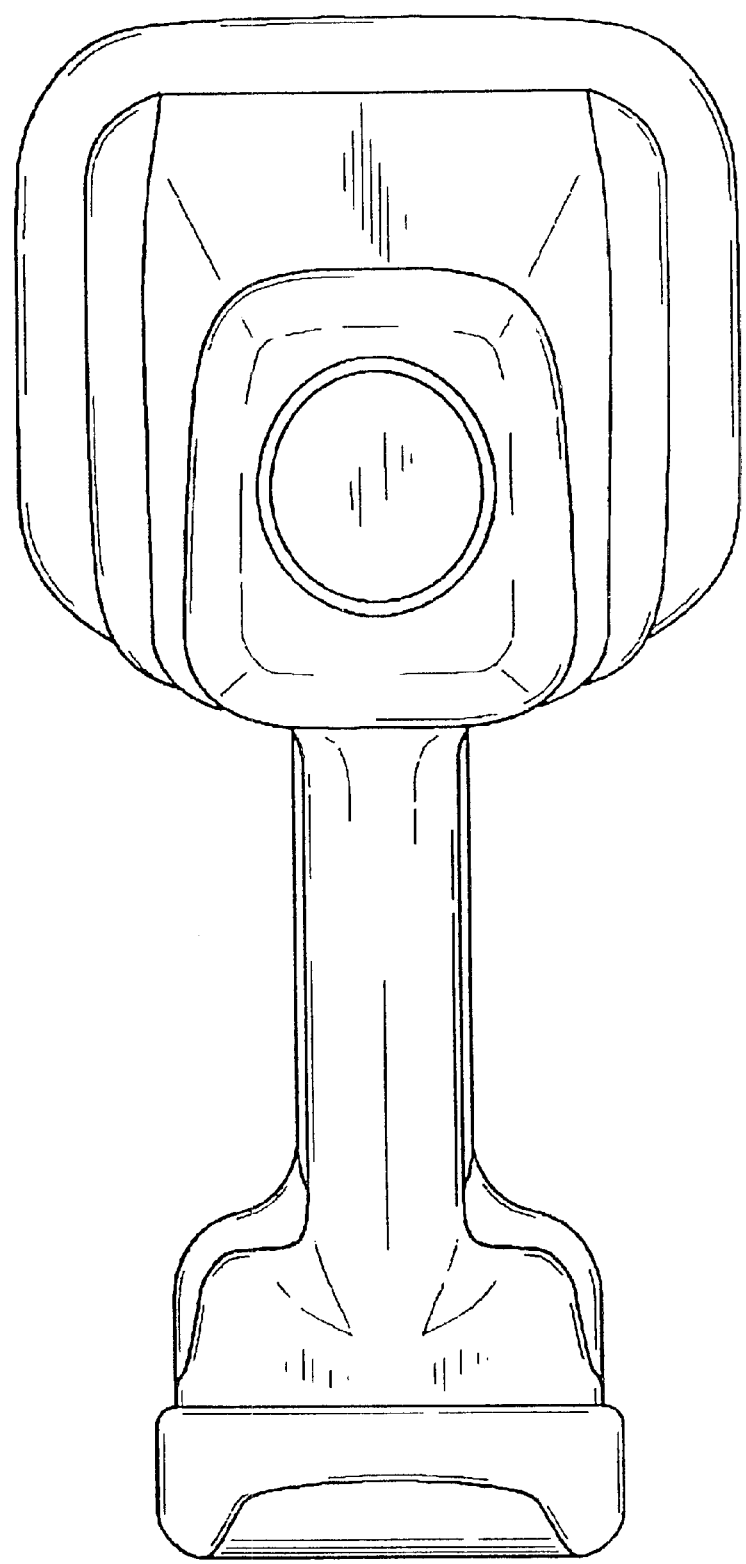
FIG. 3 is a front elevational view of the camera shown in FIG. 1.
Figure 4:
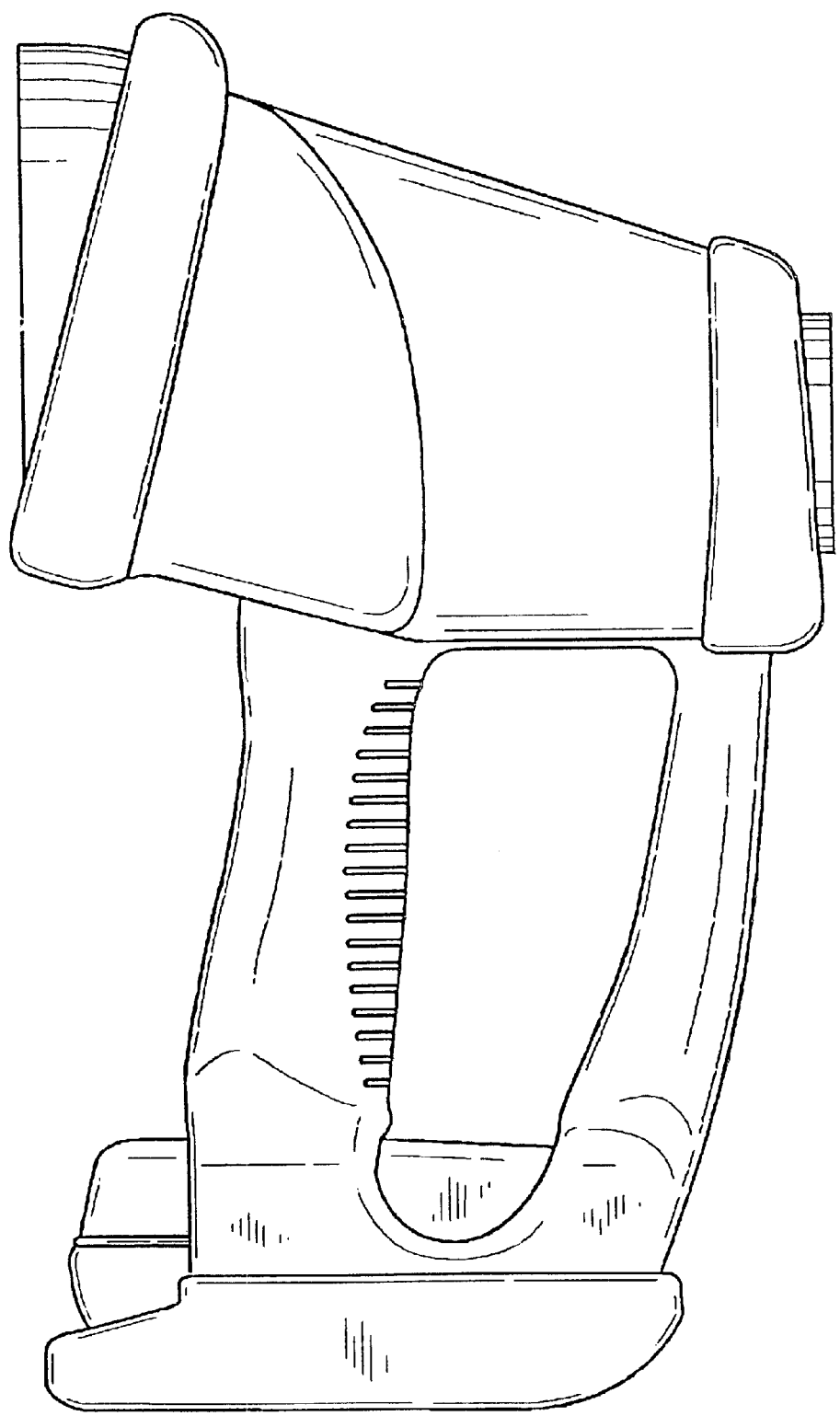
FIG. 4 is a side elevational view of the camera shown in FIG. 1. The left and right side elevational views are mirror images of each other.
Figure 5:
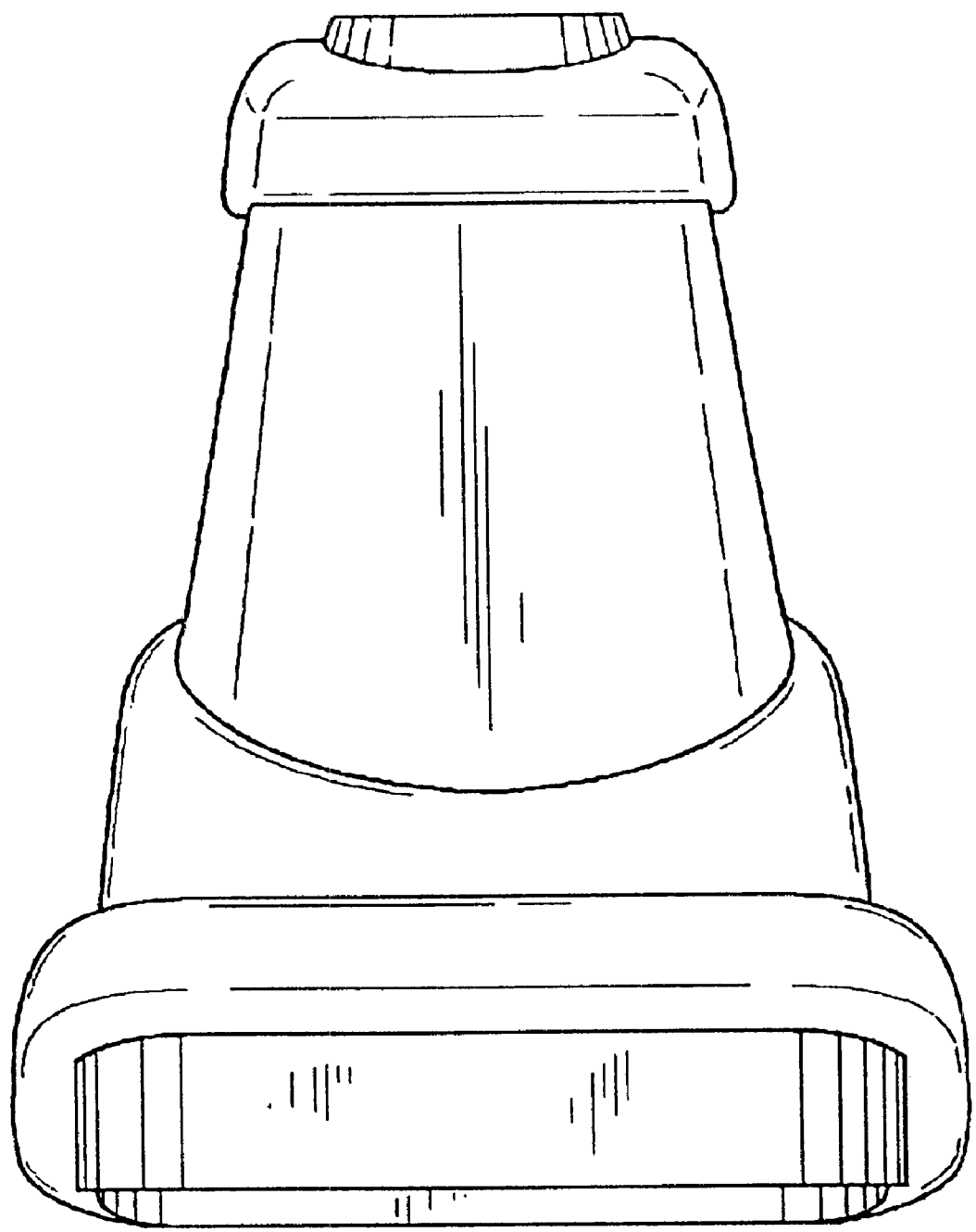
FIG. 5 is a top plan view of the camera shown in FIG. 1.
Figure 6:
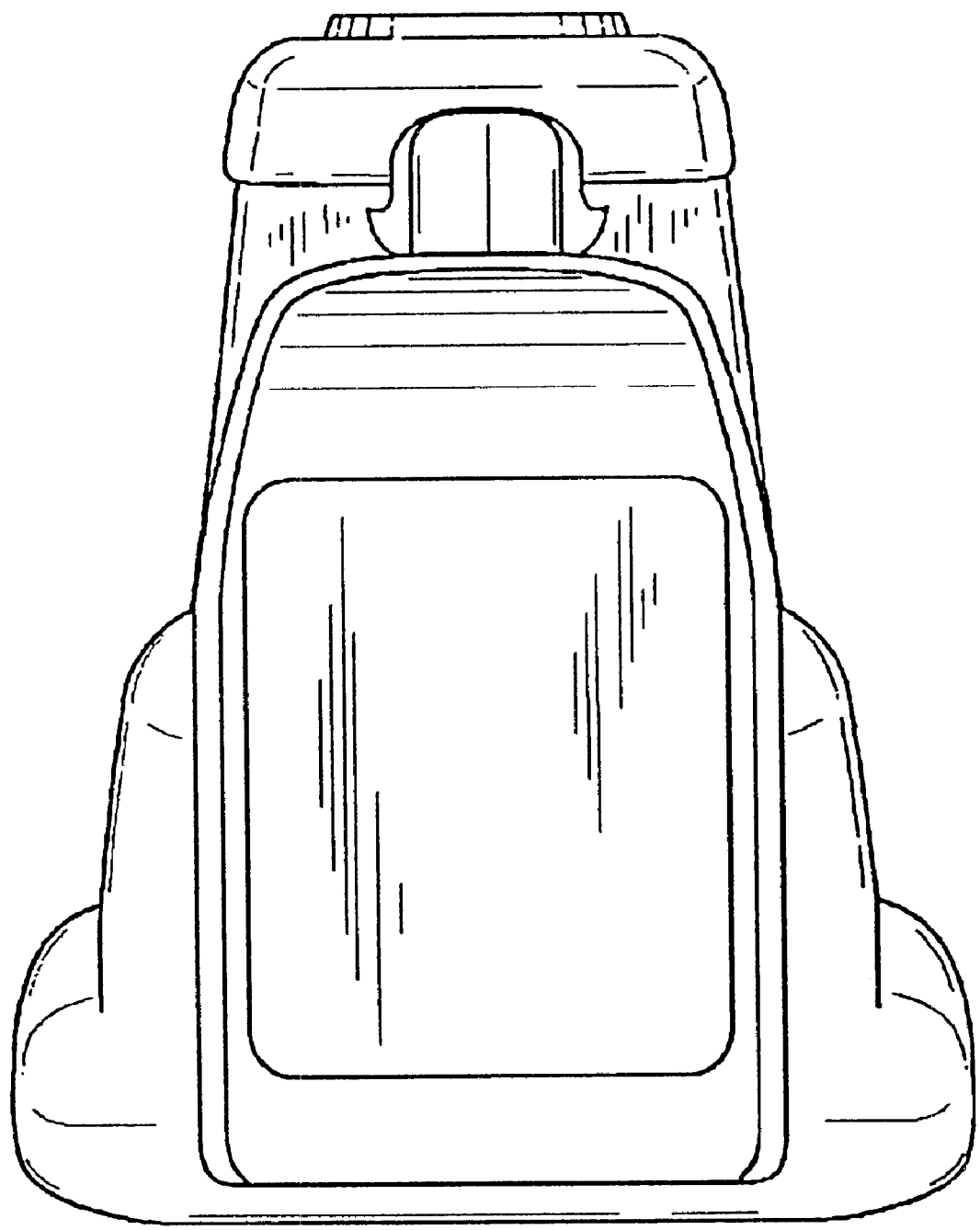
FIG. 6 is a bottom plan view of the camera shown in FIG. 1.
Figure 7:
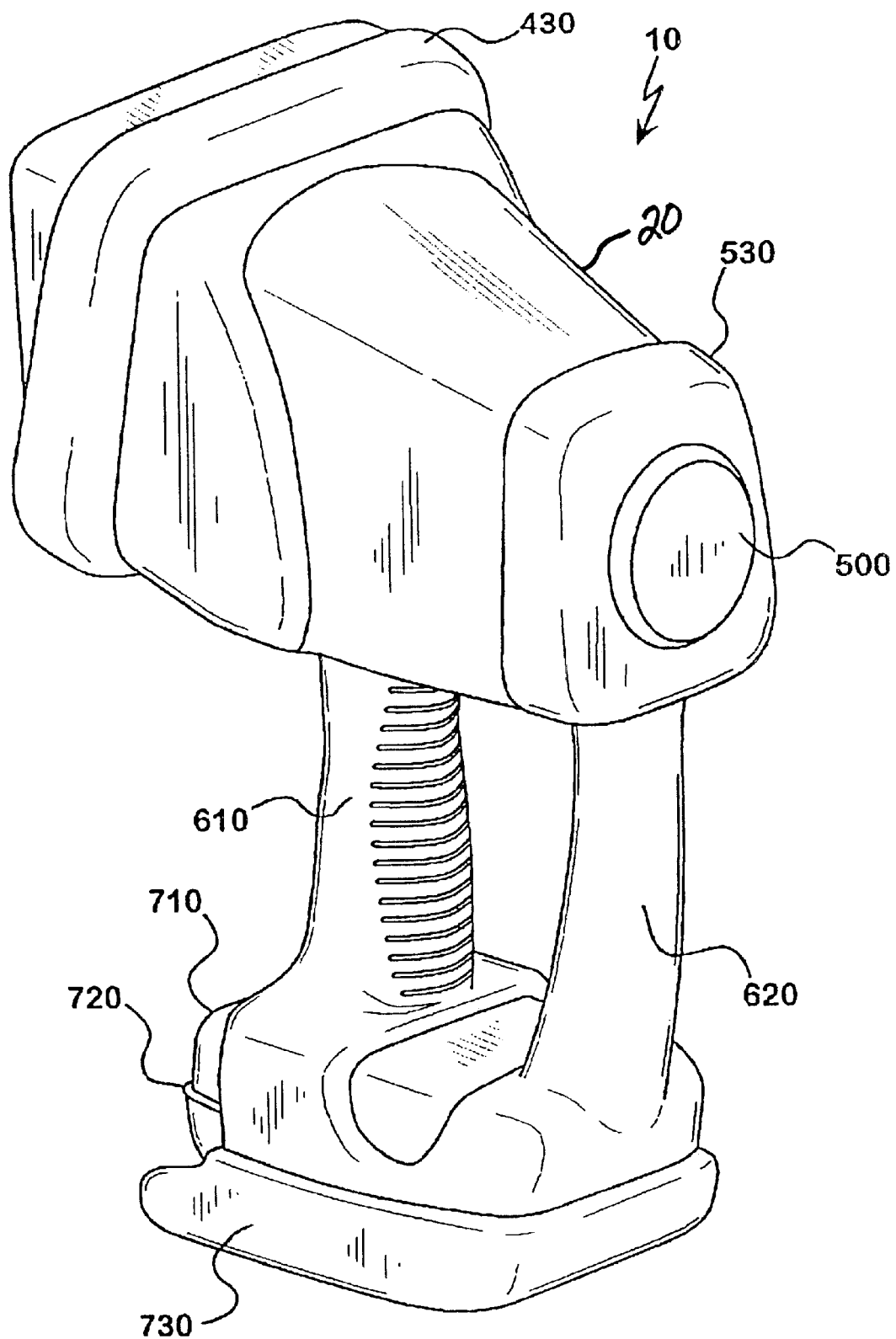
FIG. 7 is a perspective view of the camera shown in FIG. 1 in an assembled state with identifying numbers.
Figure 8:
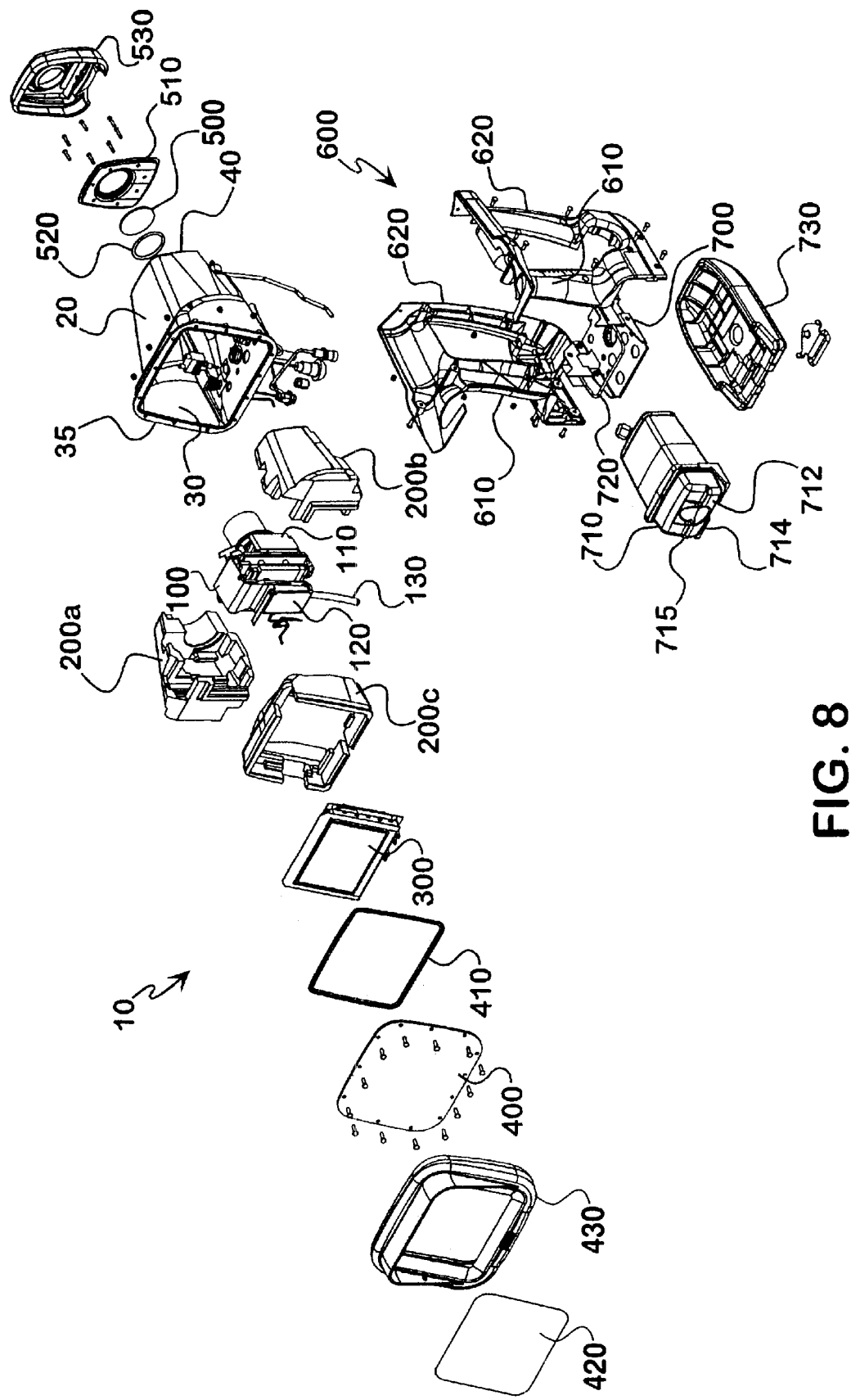
FIG. 8 is a perspective view of the thermal imaging camera of FIG. 7 in a disassembled state.

In the embodiment shown in FIGS. 7 and 8, thermal imaging camera 10 includes a housing 20. Housing 20 can, for example, be fabricated from a molded polymeric material. Preferably, housing 20 is fabricated in a manner to provide a good seal against water entering housing 20. In that regard, housing 20 is preferably formed as a continuous tube or conduit without seams along the length thereof. As shown in FIG. 8, housing 20 includes a first opening 30 at the rear thereof and a second opening 40 at the front thereof. Preferably, each of opening 30 and opening 40 are provided with a generally flat sealing surface (for example, sealing surface 35) around the perimeter thereof. Typically, generally flat sealing surfaces are more easily and reliably sealed than a curved surface. Housing 20 can therefore be better sealed (for example, against water damage) than is possible with currently available thermal imaging cameras. Moreover, the length of the sealing surface of the housing of the present invention is about one-fourth that found in currently available TICs.

Housing 20 encloses a thermal imaging camera core 100 which is an assembly of camera components that preferably includes imaging components such as a microbolometer thermal detector as described above. An example of a suitable camera core 100 for use in the present invention is the Uncooled Infrared Imaging Module, SIM 200S w/Lens available from Sanders, a British Aerospace company, located in Lexington, Mass. That camera core includes an uncooled microbolometer focal plane array assembly; a focal plane front end printed circuit board assembly (PCBA); a video signal processor PCBA; a power supply/shutter drive PCBA; a shutter drive; a lens assembly and a mounting. Camera core 100 preferably also includes a heat sink 110 to absorb heat generated internal to the camera 10. Heat sink 110 can, for example, include an aluminum housing that is filled with a phase change material such as the ComforTemp® material available from Frisby Technologies of Winstom-Salem, N.C.

Camera core 100 can also include a remote transmitter 120 (for example, an RF transmitter operating at 2.4 Giga Hertz) having an antenna 130 to transmit video produced by camera 10 to a remote receiver/monitor (not shown). A suitable transmitter for use in the present invention is the Minilink 2.4TA transmitter available from MicroTek Electronics, Inc. of Sam Clemente, Calif.

Camera core 100 is preferably held in place within housing 20 by, for example, support members 200a and 200b. The exterior profile of support members 200a and 200b preferably conforms generally to the shape of the inner wall of housing 20 while the interior profile of support members 200a and 200b conform generally to the shape of camera core 100. Such support members are preferably fabricated from a thermally insulating and shock absorbing material such as a foamed polymeric material. An example of a suitable foamed polymeric material for support members 200a and 200b is E-PAC, an expanded polypropylene foam, available from Tuscarora Incorporated of New Brighton, Pa. E-PAC is described in E-PAC: Electronic Packaging Assembly Concept available from Tuscarora Incorporated at www.tuscarora.com/epac.htm, the disclosure of which is incorporated herein by reference. Use of support members 200a and 200b instead of rigidly mounting or connecting camera core 100 to housing 20 allows for simple, quick and relatively inexpensive assembly. Moreover, use of support members such as support member 200a and 200b have been found to improve the thermal resistance and shock resistance of thermal imaging camera 10 as compared to currently available thermal imaging cameras. Preferably, support members for use in the present invention have a thermal conductivity in the range of approximately 0.01 BTU/ft-hr.-° F. to approximately 1.0 BTU/ft-hr.-° F. Such materials can also be shock absorbing by, for example, being compressible or resilient.

Camera 10 also includes a display 300 such as an LCD display as known in the art in communication with camera core 100. As described for camera core 100, display 300 is preferably held in place within housing 20 by a support member 200c of the type discussed above. The exterior perimeter or profile of support member 200c preferably generally conforms to the shape of housing 20 while the interior profile thereof generally conforms to display 300.

In general, thermal imaging cameras are operated over a wide range of thermal conditions including, for example, at subfreezing temperatures, at room temperature, and at the highly elevated temperatures experienced by firefighters at a fire scene. Many electronic components are adversely affected by extreme temperatures. The thermally insulating nature of the support members of the present invention enable camera 10 to be operated for extended period of times at elevated temperatures and at subfreezing temperatures.

A number of the components of camera 10 generate heat during operation. This presents a problem at elevated temperatures. These heat generating components include, for example, components having processors such as camera core 100 and display 300. Care must be taken to not trap such internally generated heat within camera 10 such that failures occur, even at ambient temperature. For this reason, support members 200a–c are preferably designed to insulate the internal components of camera 10 from high external or ambient temperatures while, at the same time, allowing heat generated by these components within camera 10 to dissipate at lower ambient temperatures. For example, support member 200c is preferably designed with a profile that is deeper (in the longitudinal direction of housing 20, that is, front-to-back) than display 300. This dimensioning of support member 200c creates a void behind display 300 into which heat generated by display 300 can be dissipated. Moreover, support members 200a and 200b are preferably formed with one or more open areas such as areas 205a, 205b, 210a and 210b through which heat generated within camera core 100 can be dissipated. The design of support members 200a and 200c are preferably optimized to allow dissipation of internally generated heat at ambient temperature and above while protecting the components within housing 20 from external heat at elevated temperatures high above ambient temperature. Because of the many different types of electrical components that can be used within the thermal imaging cameras of the present invention (and the widely varying heat generating and dissipating properties of such components), such optimization is preferably readily performed empirically. For example, the temperature at various points within camera 10 can be measured for various support member designs and for various temperatures.

Front opening 30 is preferably enclosed and sealed via, for example, a clear polycarbonate window 400 and an intermediate gasket 410 that cooperates with generally flat sealing surface 35 to produce a substantially waterproof seal. A cover lens 420 can be provided over polycarbonate window 400. A resilient bumper 430 (for example, a rubber bumper) is preferably provided to surround the perimeter of front opening 30 of housing 20. Resilient bumper 430 assists in absorbing the shock of an impact if the camera 10 is dropped or bumped.

A germanium window 500 is preferably provided on the front end of camera 10. Front opening 40 is preferably sealed by a front plate 510 and an intermediate gasket 520 that cooperates with a generally flat sealing surface (not shown) of opening 40. Front plate 510 also seats germanium window 500. The front end of camera 10 is preferably provided with a resilient bumper 530. Like resilient bumper 430, resilient bumper 530 assists in absorbing the shock of an impact in the event that the camera 10 is dropped or bumped.

A handle assembly 600 is preferably attached to the bottom of housing 20. Handle assembly 600 preferably forms a first handle 610 and a second handle 620 (as best illustrated in FIG. 7). Generally vertically oriented handles 610 and 620 are preferably spaced sufficiently far apart to facilitate passing of thermal imaging camera 10 from one firefighter to another even while wearing gloves. In the case of generally parallel handles 610 and 620, the handles are preferably spaced at least 2.0 inches apart, more preferably at least approximately 2.25 inches apart, and most preferably at least approximately 2.5 inches apart, over the area in which handles 610 and 620 are to be grasped by users. Rear handle 610 is used when operating camera 10 while forward handle 620 is used to pass the camera (in an upright position) to another person.

A battery compartment 700 is preferably formed at the bottom of handle assembly 600. Preferably, battery unit 710 and batteries 712 and 714 are easily insertable in and removable from battery compartment 700 even by a user wearing heavy protective gloves. In the embodiment shown in FIG. 8, for example, battery compartment 700 includes a bracket 720 that retains batteries 712 and 714 (via groove 715) within battery compartment 700. Bracket 720 is preferably rotatable out of alignment with battery unit 710 to insert or remove batteries 712 and 714. Preferably, camera 10 is provided with multiple batteries that are hot swappable. For example, two batteries 712 and 714 can be used serially. In that regard, circuitry is provided so that one battery is used before the second battery. The used battery can preferably be replaced while the second battery is in service without interrupting operation of camera 10.

The bottom of battery compartment 700 is preferably surrounded by a resilient bumper 730 (for example, rubber)

to assist in absorbing the shock of an impact if the camera 10 is dropped or bumped. Resilient bumpers 430, 530 and 730 cover all the extremities or projecting portions of camera 10 such that if camera 10 is dropped on a flat surface or plane, one of the resilient bumpers will always first contact the surface or plane regardless of the orientation of camera 10.

By placing housing 20 above handle 610 and battery compartment 700 below handle 610, the center of gravity of camera 10 coincides generally with the location at which the user holds camera 10. Because the center, of gravity of camera 10 coincides with the user's grip, the camera feels lighter and more balanced than currently available cameras of similar weight. Typically, such cameras place the housing, imaging components and power source above the handle.

The bottom of camera 10 is preferably generally flat so that camera 10 can be set upright on a generally flat surface for use without the requirement of a user holding camera 10. In that regard, the bottom surface of resilient bumper 730 is preferably generally flat. Camera 10 can thus be operated/ viewed in an upright position by a user without the user having to hold camera 10. To facilitate such operation (and general operation), display 300 is preferably larger than is the case with prior thermal imaging cameras. In one embodiment of the present invention, for example, display 300 had a diagonal measurement of approximately five inches.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A thermal imaging camera comprising: a housing encompassing a camera core, a first handle, and a compartment for an electrical component, the housing positioned at a first end of the first handle and the compartment for an electrical component positioned at the opposite end of the first handle such that the center of gravity of the thermal imaging camera coincides generally with the handle when the thermal imaging camera is in use.

2. The camera of claim 1 further comprising a second handle positioned between the housing and the compartment for an electrical component, the second handle being oriented generally parallel to the first handle.

3. The thermal imaging camera of claim 2 wherein the first handle and the second handle are spaced at least 2.0 inches apart over the area in which the first handle and the second handle are to be grasped.

4. The thermal imaging camera of claim 1 further comprising resilient material placed over all projecting portions of the housing such that when the housing is contacted with a plane, the resilient material will first contact the plane regardless of the orientation of the housing relative to the plane.

5. The thermal imaging camera of claim 1 wherein the housing has resilient material surrounding a front end thereof.

6. A thermal imaging camera comprising: a housing encompassing a camera core, a compartment for an electrical component, a first handle and a second handle, the first handle and the second handle being spaced to facilitate passing the camera between two people without setting the camera down, the first handle and the second handle being positioned adjacent to and generally parallel to each other, the first handle and the second handle being positioned intermediate between the housing and the compartment for an electrical component.

7. The thermal imaging camera of claim 6 further comprising resilient material placed over all projecting portions of the housing such that when the housing is contacted with a plane, the resilient material will first contact the plane regardless of the orientation of the housing relative to the plane.

8. The thermal imaging camera of claim 6 further comprising a generally flat surface thereon whereby the thermal imaging camera can be set in an upright position on the generally flat surface.

9. A thermal imaging camera comprising: a housing encompassing a thermal imaging camera core comprising a thermal detector and a display, a compartment for an electrical component, and at least a first handle positioned between the housing and the compartment for an electrical component, the bottom of the compartment being generally flat so that the thermal imaging camera can be set in an upright position on the bottom of the compartment with the display being visible to a user.

* * * * *